(12) United States Patent
Zhang et al.

(10) Patent No.: US 9,331,953 B2
(45) Date of Patent: May 3, 2016

(54) DEVICE MANAGEMENT METHOD, MIDDLEWARE, AND MACHINE-TO-MACHINE COMMUNICATIONS PLATFORM, DEVICE, AND SYSTEM

(71) Applicant: Huawei Technologies Co., Ltd., Shenzhen, Guangdong (CN)

(72) Inventors: Yongjing Zhang, Nanjing (CN); Yonggang Bian, Nanjing (CN); Cheng Huang, Shenzhen (CN); Lei Jin, Nanjing (CN); Lunjian Mu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 13/854,797

(22) Filed: Apr. 1, 2013

(65) Prior Publication Data

US 2013/0219064 A1    Aug. 22, 2013

Related U.S. Application Data

(63) Continuation of application No. PCT/CN2011/074272, filed on May 18, 2011.

(30) Foreign Application Priority Data

Sep. 30, 2010   (CN) .......................... 2010 1 0505878

(51) Int. Cl.
  *G06F 15/173*    (2006.01)
  *H04L 12/911*    (2013.01)
  (Continued)

(52) U.S. Cl.
  CPC .................. *H04L 47/70* (2013.01); *H04W 4/00* (2013.01); *H04W 4/005* (2013.01); *H04W 4/18* (2013.01)

(58) Field of Classification Search
  CPC ......... H04W 4/00; H04W 4/18; H04W 4/005; H04L 47/70
  USPC .......................................... 709/223, 225, 246
  See application file for complete search history.

(56) References Cited

U.S. PATENT DOCUMENTS 7,966,402 B2 *   6/2011   Emerson et al. ............... 709/226
8,185,629 B2 *   5/2012   Hoeksel ........................ 709/225
(Continued)

FOREIGN PATENT DOCUMENTS

CN    101083537 A    12/2007
CN    101421978 A    4/2009
(Continued)

OTHER PUBLICATIONS

International search report and Written Opinion issued in corresponding PCT application No. PCT/CN2011/074272, dated Aug. 18, 2011, total 5 pages.
(Continued)

*Primary Examiner* — Oanh Duong
(74) *Attorney, Agent, or Firm* — Huawei Technologies Co., Ltd.

(57) ABSTRACT

Example embodiments of the present invention disclose a device management method, middleware, computer-program products, system, and apparatuses. The method includes: a resource access request is received by using a resource access interface, where the resource access request includes: a URI that is used to indicate a storage location of an accessed management object MO data resource; according to pre-created mapping between the resource access request of the MO data resource and a DM command, the resource access request of the MO data resource is converted into corresponding DM command, and according to pre-created mapping between the MO data resource and MO information, the MO information corresponding to accessed MO data is determined; and the DM command is sent to a target device corresponding to the URI to manage the MO information corresponding to the accessed MO data, so that the M2M applications may access different M2M platforms to manage devices, implementing end-to-end device management and related service applications.

18 Claims, 11 Drawing Sheets

(51) Int. Cl.
*H04W 4/00* (2009.01)
*H04W 4/18* (2009.01)

(56) References Cited

U.S. PATENT DOCUMENTS

| | | | |
|---|---|---|---|
| 8,312,128 B2* | 11/2012 | Conrad | 709/223 |
| 8,510,451 B2* | 8/2013 | Wada | 709/227 |
| 8,762,547 B2* | 6/2014 | Stanev | 709/228 |
| 8,862,746 B2* | 10/2014 | Panattu et al. | 709/227 |
| 8,886,772 B2* | 11/2014 | Visser et al. | 709/220 |
| 8,942,191 B2* | 1/2015 | Nath et al. | 370/329 |
| 9,009,810 B2* | 4/2015 | Grigoriev et al. | 726/12 |
| 9,037,730 B2* | 5/2015 | Sanchez Herrero | 709/227 |
| 2007/0093243 A1 | 4/2007 | Kapadekar et al. | |
| 2007/0294385 A1 | 12/2007 | Kapadekar et al. | |
| 2009/0144434 A1 | 6/2009 | Tian et al. | |
| 2009/0193031 A1 | 7/2009 | Maes | |
| 2009/0204578 A1 | 8/2009 | Dang | |
| 2009/0280794 A1 | 11/2009 | Desruelle et al. | |

FOREIGN PATENT DOCUMENTS

| | | |
|---|---|---|
| CN | 101477535 A | 7/2009 |
| CN | 101730123 A | 6/2010 |
| WO | 2009102390 A2 | 8/2009 |

OTHER PUBLICATIONS

Clean version of Draft ETSI TS 102 690 V<0.6.2>, "Machine- to-Machine communications (M2M); Functional architecture," dated Jul. 2010, total 116 pages.

Marked version of Draft ETSI TS 102 690 V<0.6.2>, "Machine- to-Machine communications (M2M); Functional architecture," Jul. 2010, total 128 pages.

* cited by examiner

DEVICE MANAGEMENT METHOD, MIDDLEWARE, AND MACHINE-TO-MACHINE COMMUNICATIONS PLATFORM, DEVICE, AND SYSTEM

CROSS-REFERENCE TO RELATED APPLICATIONS

This application is a continuation of International Application No. PCT/CN2011/074272, filed on May 18, 2011, which claims priority to Chinese Patent Application No. 201010505878.2, filed on Sep. 30, 2010, both of which are hereby incorporated by reference in their entireties.

FIELD OF THE INVENTION

The present invention generally relates to the communications technology field, and in particular, to a device management methods, apparatuses, systems, and computer program products in a machine-to-machine communications (Machine-to-Machine Communications, M2M) system.

BACKGROUND OF THE INVENTION

Machine-to-Machine (M2M) communications refer to network-based applications and services that use intelligent machine interaction as the core structure. By inserting a wireless or wired communications module and application processing logic inside a machine, it implements data communication without human intervention, thereby meeting information-based requirements of users for aspects such as machine monitoring, command and scheduling, and data collection and measurement. FIG. 1 shows a typical M2M system architecture. Various M2M terminals (such as a sensor and a micro controller) are directly connected or remotely connected by using an M2M gateway to an M2M service platform, so that various M2M applications (such as electricity meter reading and intelligent traffic) acquire data collected by the M2M terminals or perform remote control and management on the M2M terminals by using service capabilities provided by the M2M service platform.

Remote device management is an important function of the M2M system. Currently, wide area network-based remote device management technologies mainly include the device management (Device Management, DM) specification defined by the open mobile alliance (Open Mobile Alliance, OMA). The DM specification defines implementing remote management of M2M devices by operating management object (Management Object, MO) data on M2M devices (including M2M gateway and M2M terminal). Existing DM systems provide auxiliary management plane functions, and are relatively independent of daily service application processes of terminal users. After finding a terminal fault, a user initiates a DM process (for example, s/he dials the customer service number). Then the customer service or administrator performs a DM task by controlling a device management server (DM Server, DMS). However, as the number of M2M devices is huge, and they are often unattended, M2M applications often need to actively monitor and detect faults and problems of M2M devices and perform corresponding upgrade and maintenance. Therefore, the M2M platform needs to use DM functions as a public service capability, and open a uniform access interface to the M2M applications, thereby implementing end-to-end device management and relevant service applications.

SUMMARY OF THE INVENTION

Example embodiments of the present invention provide a device management method, a middleware, and an Machine-to-Machine (M2M platform), a device, and a system, to achieve the purpose that M2M applications access Device Management (DM) capabilities of different M2M platforms by using a uniform resource access interface. More specific solutions are as follows:

One example embodiment provides a device management method, that receives a resource access request by using a resource access interface, where the resource access request includes: a uniform resource identifier (URI) that is used to indicate a storage location of an accessed management object (MO) data resource; and converts the resource access request into a corresponding DM command according to pre-created mapping between the resource access request of the MO data resource and a device management DM command. Note also that, the MO information corresponds to accessed MO data, which is also determined according to pre-created mapping between the MO data resource and MO information. And then the DM command is sent to a target device corresponding to the URI to manage the MO information corresponding to the accessed MO data.

Other example embodiments provide a middleware, including: a resource access request receiving unit, configured to receive a resource access request by using a resource access interface, where the resource access request includes: a uniform resource identifier URI that is used to indicate a storage location of an accessed management object (MO) data resource; a control command converting unit, configured to refer to pre-created mapping between the resource access request of the MO data resource and a DM command, convert the resource access request into its corresponding DM command, and determine, according to pre-created mapping between the MO data resource and MO information, the MO information corresponding to the accessed MO data resource; and a control command sending unit, configured to send the DM command to a target device corresponding to the URI to manage the MO information corresponding to the accessed MO data resource.

A machine-to-machine communications M2M platform that has the middleware and an M2M device are provided.

A machine-to-machine communications M2M system, including: an M2M device and a middleware, where the middleware is configured to: receive a resource access request by using a resource access interface, where the resource access request includes: a uniform resource identifier URI that is used to indicate a storage location of an accessed management object MO data resource; refer to pre-created mapping between the resource access request of the MO data resource and a DM command, convert the resource access request into its corresponding DM command, and determine, according to pre-created mapping between the MO data resource and MO information, the MO information corresponding to the accessed MO data resource; and send the DM command to a target device corresponding to the URI to manage the MO information corresponding to the accessed MO data resource; and the M2M device is configured to receive and execute the DM command, obtain result data, and return the result data to the middleware.

From the technical solutions, it may be seen that the device management method disclosed in the embodiment of the present invention uses a uniform resource access interface to connect M2M applications to the M2M platform, so that the M2M applications may access DM of different M2M platforms, thereby implementing end-to-end device management and related service applications.

BRIEF DESCRIPTION OF THE DRAWINGS

To describe the technical solutions of the present invention in more detail, the following briefly describes the accompanying drawings required for illustrating example embodiments of the present invention. The accompanying drawings described below are only some embodiments of the present invention, and a person skilled in the art may further obtain other drawings according to the accompanying detailed specification and drawings without any undue experimentation or creative effort.

DETAILED DESCRIPTION OF THE EMBODIMENTS

The following describes the technical solutions of the present invention in more complete detail with reference to the accompanying drawings of the example embodiments of the present invention. As will be appreciated, the described embodiments are just some examples of the present invention, rather than all embodiments of the present invention. Other embodiments obtained by a person skilled in the art without any undue experimentation or creative effort based on such embodiments shall fall into the protection scope of the present invention.

The present invention discloses a device management method. In the method, the following purpose is achieved: machine to machine (M2M) applications access M2M platforms by using a resource access interface to implement different device management (DM) commands.

The resource access interface mentioned in the present invention may be any one resource-based access protocol interface, for example, an HyperText Transfer Protocol, hypertext transfer (HTTP) interface, an XML Configuration Access Protocol or an XML configuration access protocol (XCAP) ( ) interface, and an interface extended based on an existing resource-based access protocol interface. The present invention does not confine the application of this method in an M2M system, and the method may also be applied in other communications systems.

Figure 1:
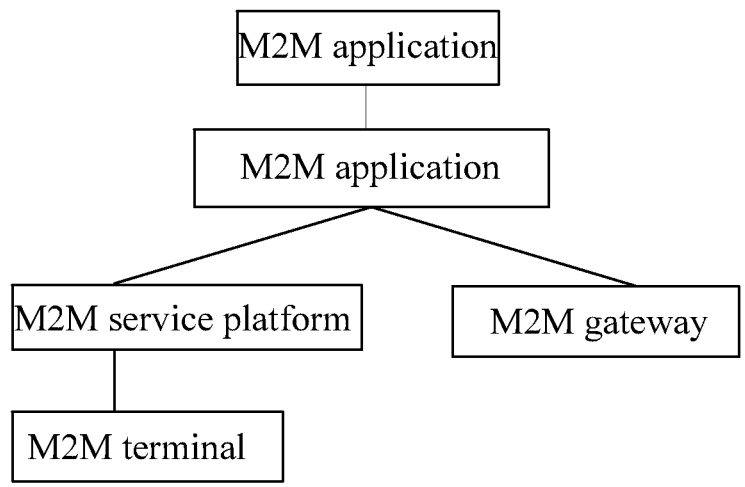
FIG. 1 is a schematic structural diagram of a typical machine to machine (M2M system) disclosed in a first embodiment of the present invention.
Figure 2:
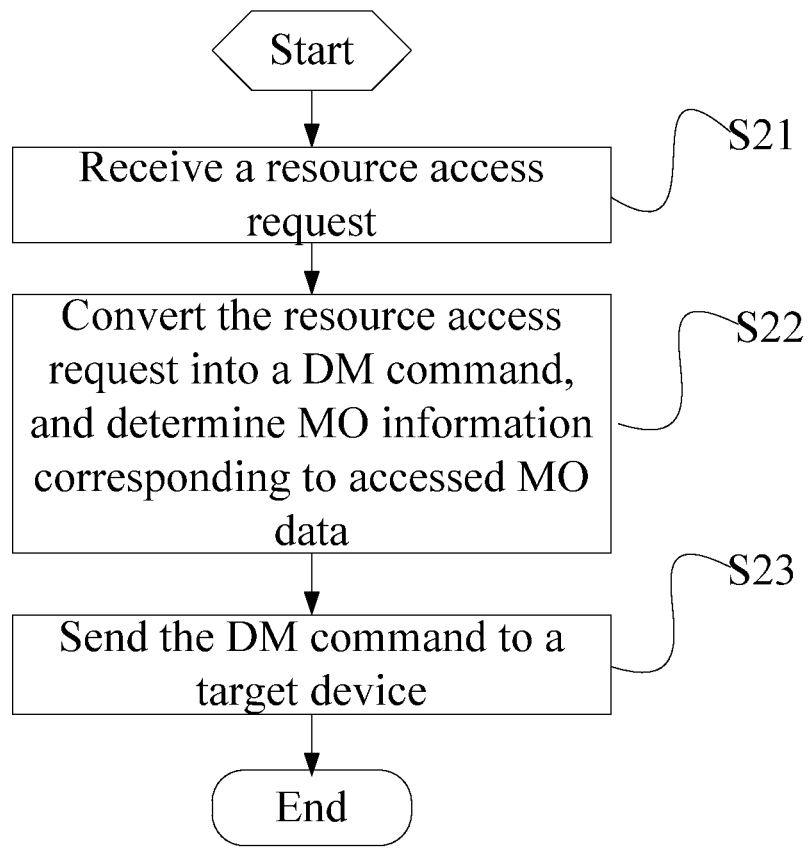
FIG. 2 is a flow chart of a device management method disclosed in an embodiment of the present invention.

A more specific implementation mode follows:

For example, one implementation process of a device management method disclosed in the present invention is shown in FIG. 2, and includes the following steps:

Step S21: a resource access request may be received by using a resource access interface, where the resource access request includes: a uniform resource identifier URI that is used to indicate a storage location of an accessed MO data resource.

During implementation of this process, MO data resources corresponding to MO data information on M2M devices need to be created in advance according to DM Tree and Description Serialization (DM TNDS specification, where the MO data resources may be XML Configuration Access Protocol (XCAP) resources, or may also be data resources of other types, and then the access to the MO data resources is implemented by using a resource access method corresponding to data resources and a resource access interface created by using this method. Management Object (MO) resources may be mapped to an M2M platform or an M2M device, and locations of MO resources are determined by using URIs. The resource access request may be received by a middleware separated from the platform and device which receives the request sent by an M2M application and forwarded by the platform, or the resource access request may be received by middleware that is installed on the platform which receives the request from an M2M application, or the resource access request may also be received by middleware that is installed on a device which receives the request forwarded by middleware installed on the platform or forwarded by the platform after middleware that is installed on the platform or the platform receives the request. The specific case depends on actual needs.

Step S22: The resource access request of the MO data resource is converted, according to pre-created mapping between the resource access request of the MO data resource and a DM command, into its corresponding DM command, and determine, according to pre-established or created mapping between the MO data resource and MO information, the MO information corresponding to the accessed MO data.

An M2M application sends a resource application request by using the resource access interface, and the object to be accessed by the M2M application is MO resource data. However, what is actually needed is to control the MO information corresponding to the MO resource data. Therefore, the resource access request needs to be converted, according the mapping between a DM command and a resource access request set in advance, into the DM command that is recognizable for MO data information, so as to implement management on the MO information.

Resource access interfaces in the prior art include an HTTP interface and an XCAP interface. The XCAP interface only provides a basic set of resource access request methods, which includes three types of requests, i.e., GET, PUT, and DELETE, which indicate the operations of acquiring, replacing or adding, and deleting corresponding XCAP resources, respectively. In order that an existing DM command may be mapped to a corresponding XCAP request, extensions to XCAP are needed. For example, example embodiments provide extension may be performed by using an HTTP protocol to obtain an extended resource access request. Some of these types of the extended resource access requests to implement corresponding operations on the MO data resources may include: an execution request; a copy request; an atomic operation request; a sequential atomic operation request; an asynchronous reporting request; a request for a group device operation on multiple devices in the system; a condition operation request; or a combined condition operation request. By using data that may be included in the resource access request, the middleware can determine the type of the request that currently needs to be used for acting on the MO data, and then converts the request into a DM command corresponding to the type of the request needed.

In addition, one example embodiment of the present invention maps MO information in advance to an MO data resource, for example, an XCAP resource, so that a resource access request may act on the resource, and then a DM command operation may be implemented on the MO information according to the mapping between the resource access request and the DM command and the mapping between MO information and the XCAP resource.

Step S23: The DM command is sent to a target device corresponding to the URI to manage the MO information corresponding to the accessed MO data.

The converted DM command may be sent to a target device corresponding to the accessed MO data resource. This process may be completed by using the device management (DM) specification protocol defined by the open mobile alliance (OMA) between a device management server (DMS) and a device management client DMC in the target device in the prior art, or may also be completed by using a resource access interface, for example, an XCAP or HTTP interface. After receiving the command, the target device executes the command to manage corresponding MO information, thereby implementing the device management function.

In the device management method disclosed in accordance with one example embodiment, MO information on an M2M device may be mapped to an MO data resource, and by using pre-established or pre-created mapping between resource access requests and DM commands, an external M2M application may access and control MO information by using a resource access interface, therefore the purpose that the M2M application manages remote devices by using an open uniform interface may be achieved.

In this embodiment, after the DM command is sent, the device may successfully receive the DM command, generate result data after executing the DM command, and return the result data to indicate that one successful management process is complete. For example, assume that the type of the resource access request is GET and operational data of the target device may be acquired. After the device executes a corresponding DM command, the result data may be the operational data of the target device. Certainly, the device may also not successfully receive the DM command. In this case, the M2M application may continue to send the resource access request after no return message is received within preset time, or may also end the operation. The specific implementation mode depends on an application scenario.

Figure 3A:
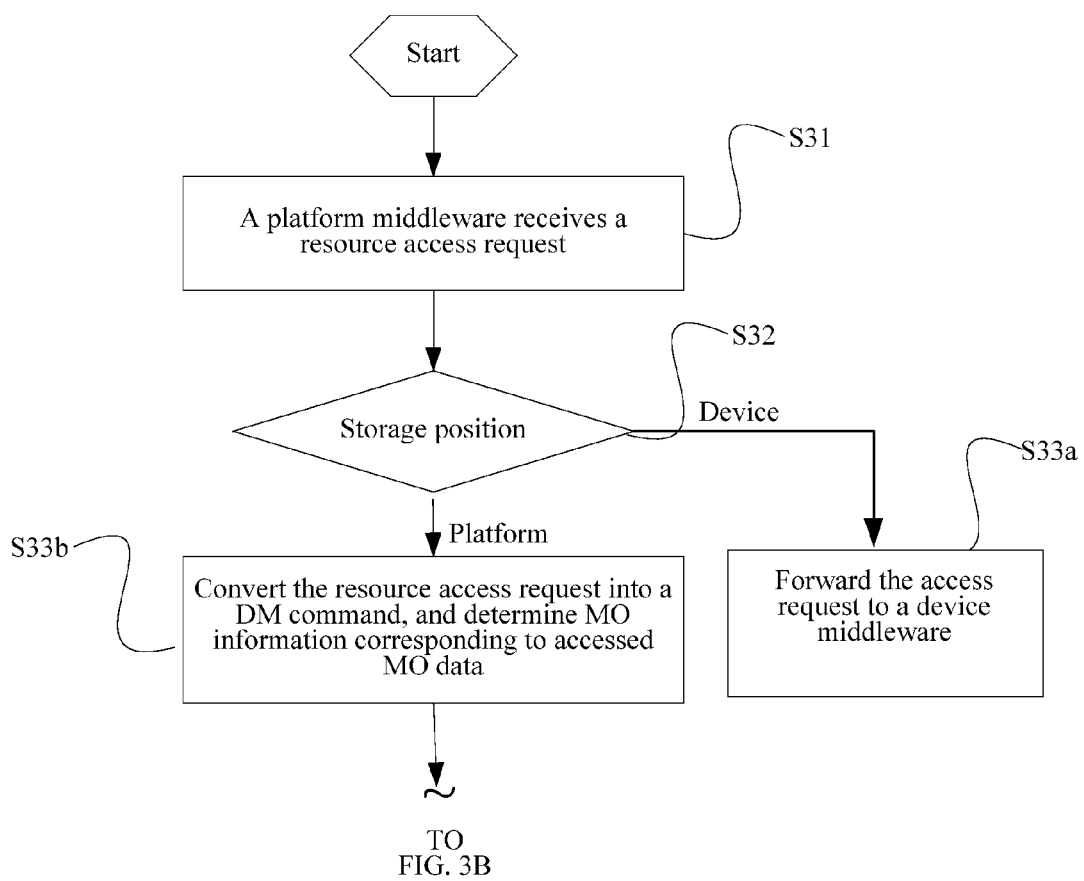
FIGS. 3A and 3B are flow charts of another device management method disclosed in an embodiment of the present invention.
Figure 3B:
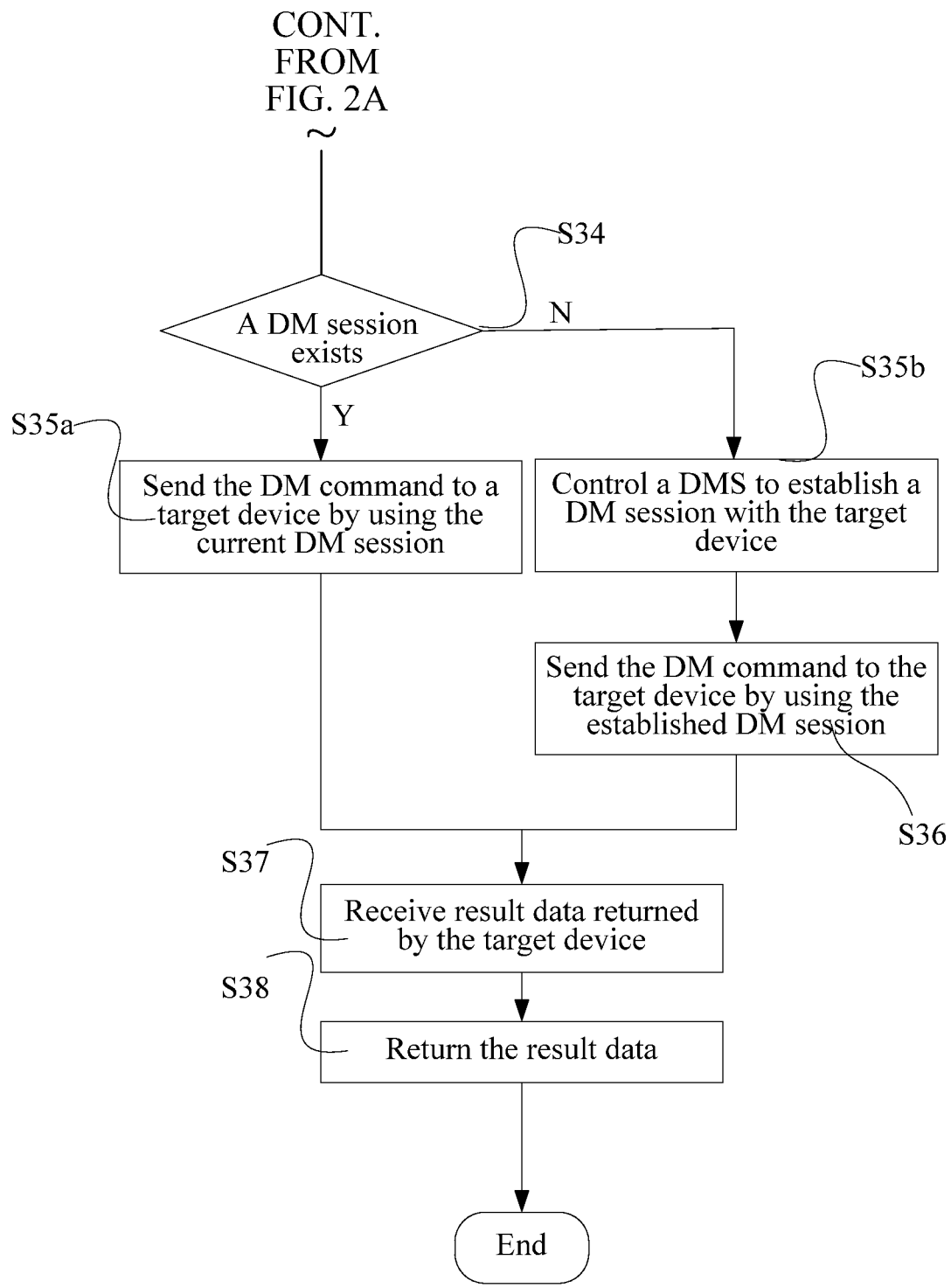

The method disclosed in the preceding embodiment may be an operation performed by middleware that may be separated from a platform and a device to implement communication between the platform and the device, or may also be an operation performed by a platform middleware that may be installed on the platform and a device middleware that may be installed on the device by mutual cooperation to implement the preceding purpose. The solutions for implementing the method are both that: converting a resource access request sent by an M2M application into a DM command. and the process difference between which the middleware that may be separated from a platform and a device and which platform middleware that may be installed on the platform and a device middleware that may be installed on the device lies only in that specific implementation processes according to different cases. For example, when the accessed MO data resource in the resource access request sent by an M2M application may be stored on the platform, in order that the resource access request is more conveniently converted into a DM command, the platform middleware may implement communication between the platform and the device by using another device management method disclosed in this and other example embodiments to manage the device. In one example embodiment, an XCAP resource access interface is used to implement a connection between the M2M application and the middleware. The process is shown in FIGS. 3A and 3B, and may include the following steps and/or acts:

Step S31: A platform middleware receives a resource access request sent by an M2M application by using an XCAP resource access interface, where the resource access request includes a uniform resource identifier URI that may be used to indicate a storage location of an accessed MO data resource.

Step S32: The storage location of the accessed MO data resource may be determined according to the URI; if the storage location is in a platform, execute step S33a; if the storage location is in a device, execute S33b.

Step S33a: According to pre-created mapping between the resource access request of the MO data resource and a device management DM command, the resource access request of the MO data resource may be converted into its corresponding DM command. And According to pre-created mapping between the MO data resource and MO information, the MO information corresponding to the accessed MO data may be determined, and execute step S34.

The storage location is in the platform. The platform middleware converts the resource access request of the MO data resource to the DM command and determines MO information corresponding to the accessed MO data.

Step S33b: The resource access request may be forwarded to a device middleware to process. Because the storage location is in a device, in this embodiment, the resource access request may be forwarded to the device middleware to convert the request into the DM command more conveniently, so that the device middleware completes subsequent operations. The specific operation process may be described in detail later.

Step S34: Determine whether a DM session between a device management server DMS and a device management client (DMC) at a target device exists; if the session between the management server DMS and the target device exists, execute step S35a; if no, execute step S35b.

According to this embodiment, a session between the DMS and the DMC at the target device may be used to send the DM command. So, whether a DM session between both already exists needs to be determined.

Step S35a: The DM command may be sent to the DMC at the target device by using the current DM session.

Step S35b: A DM session control command may be sent to the DMS to control the DMS to establish a DM session with the DMC of the target device.

The DMC of the M2M device has not established a DM session with the DMS yet, and the DMS may be instructed to send a DM notification message to the DMC so as to establish the DM session between the DMS and the DMC. This embodiment does not restrict the process of establishing a session to that described in step S35b. Likewise, other solutions may be used as long as the session between the DMS and the DMC may be established.

The DMC sends a DM session establishment message to the DMS according to the received DM notification message by following the requirements of the OMA-DM protocol specification in the prior art, where the message carries necessary M2M device information (DevInfo), for example, an M2M device identity dev1, to indicate that the DM session between the DMS and the DMC on the M2M device has been established.

Step S36: The DM command may be sent to the DMC of the target device by using the established DM session.

The DMS sends a corresponding DM command to a target DMC, for example, to indicate that the DMS acquires, on the M2M device, the target MO information corresponding to the accessed MO data.

Step S37: A result data generated and returned by the DMC of the target device may be received after the DMC of the target device executes the DM command, so as to manage the MO information corresponding to the accessed MO data.

The DMC executes the corresponding DM function and operation according to received DM command message by following the requirements in the OMA-DM protocol specification in the prior art, and returns execution result data to the DMS, for example, specific information about the target MO on the M2M device. The DMS returns the DM execution result data from the DMC to the platform middleware.

Step S38: The result data may be returned.

The platform middleware returns the result data to a resource access requesting party, for example, the M2M application.

A process of sending an MO control command by establishing a DM session may be added to this embodiment. In an M2M system in the prior art, a standard interface that may be based on the OMA-DM protocol specification and that may be used to establish the DM session may already exist between a DMS and a DMC. Therefore, in this embodiment, the standard interface may be reused, only a connection between an M2M application and an M2M platform needs to be established, and then the DM session connection established by using the standard interface may be used to send the MO control command, thereby ensuring that the M2M application manages a remote device by using an open uniform interface without changing the interface relationship in the existing system.

In this embodiment, to avoid costing unnecessary overhead due to session maintenance when no DM command exists, after a DM command is completely sent, whether a subsequent DM command exists within a preset session period may be further determined; if a subsequent DM command exists, continue the execution; if a subsequent DM does not exist, close the session.

It should be noted that, after the resource access request in the preceding embodiment is forwarded to the device middleware (in step S33b), the device middleware also execute an execution process similar to the preceding process, that is: converts the resource access request into a DM command and determines MO information corresponding to the MO data resource. In addition, the device middleware accordingly executes other related operations, thereby implementing mutual coordination with the platform middleware on the platform, and implementing communication between the platform and devices. In this way, the purpose that the M2M application manages devices by using the platform. The specific process may be shown in FIG. 4, and includes the following steps:

Step S41: The resource access request forwarded by the platform middleware may be received.

Step S42: According to the pre-created mapping between the resource access request of the MO data resource and the DM command, the resource access request of the MO data resource may be converted into its corresponding DM command. And according to the pre-established created mapping between the MO data resource and MO information, the MO information corresponding to the accessed MO data may be determined.

Step S43: The resource access request may be sent to the DMC of the target device to manage the MO information corresponding to the accessed MO data.

The DM command may be sent to the DMC of the target device where the device middleware.

Step S44: Result data may be received, which is returned after the DMC of the target device executes the DM command The DMC executes the DM command to process the MO information, obtains result data, and returns the result data to the device middleware.

Step S45: The result data may be returned to the platform middleware.

Figure 4:
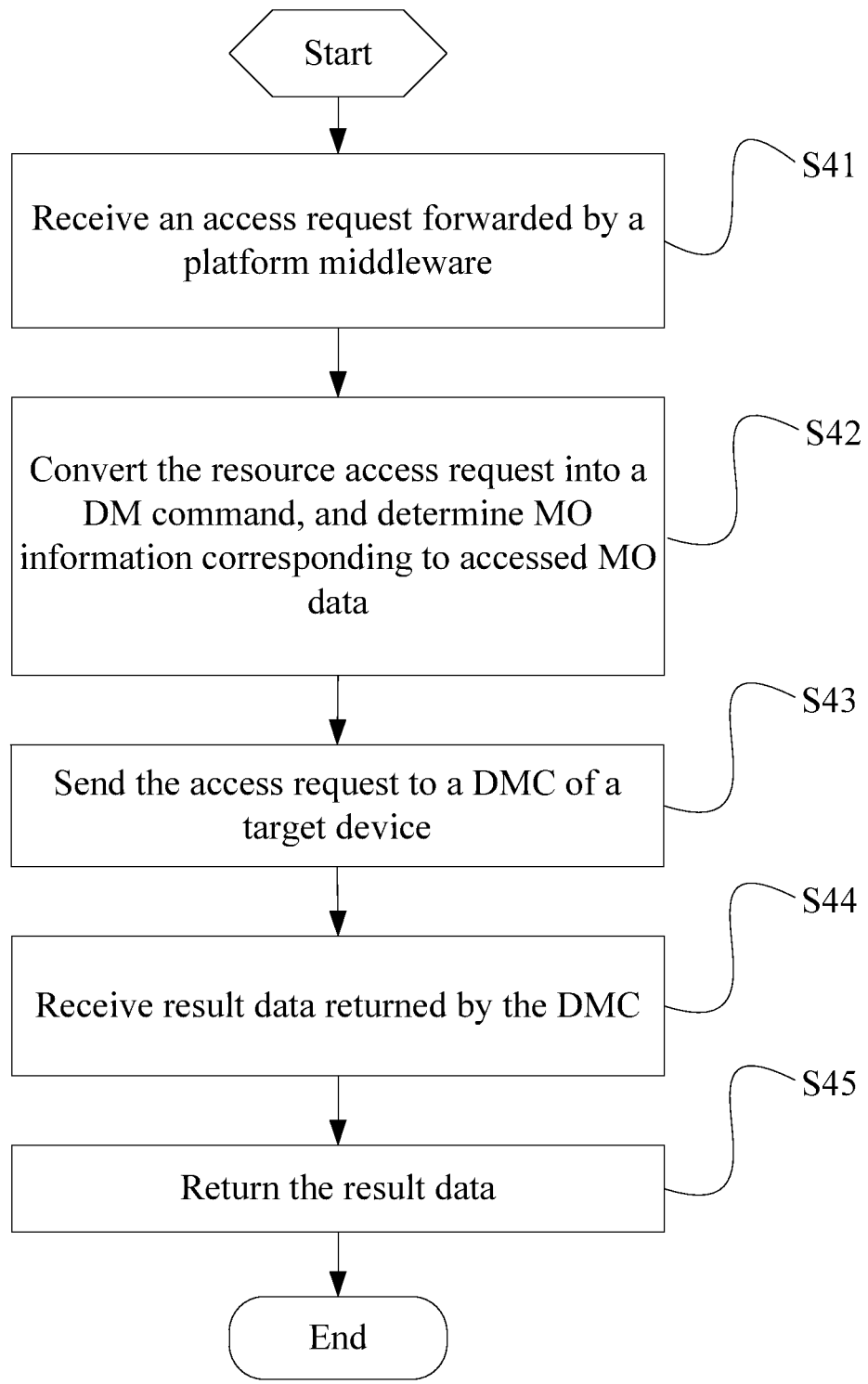
FIG. 4 is a flow chart of another device management method disclosed in an embodiment of the present invention.

It should be noted that, when the device middleware processes the resource access request, steps S43 and S44 in the process shown in FIG. 4 are an interactive procedure between internal modules of the target device, and step S45 may be an interactive procedure between the device middleware and the platform middleware. Only after receiving the returned result data, the platform middleware returns result data to the M2M application that sends the request. These are different from the interactive procedure between the platform middleware and the device middleware and the interactive procedure between the platform middleware and the M2M application, which are shown in steps S36 to S38 in FIG. 3.

It may be seen that, in the data control method disclosed in this embodiment, different processing procedures are used according to different storage locations of the accessed MO data resource. That is, when the accessed MO data resource may be stored on the platform, it may be the platform middleware that executes the conversion of the DM command, the determination of MO information, and the sending procedure; when the accessed MO data resource is stored on the device, it is the device middleware that executes the conversion of the DM command, the determination of MO information, and the sending procedure. The purpose is to enable the platform middleware or device middleware to more conveniently use the preset mapping between the MO data resource access request and the DM command and use the mapping between the MO data resource and the MO information to find the managed MO information.

Certainly, this embodiment does not restrict the preceding processing procedures. The storage location of the accessed MO data resource may not be considered, and the device for executing related command conversion and sending may be set according to actual conditions.

Figure 5:
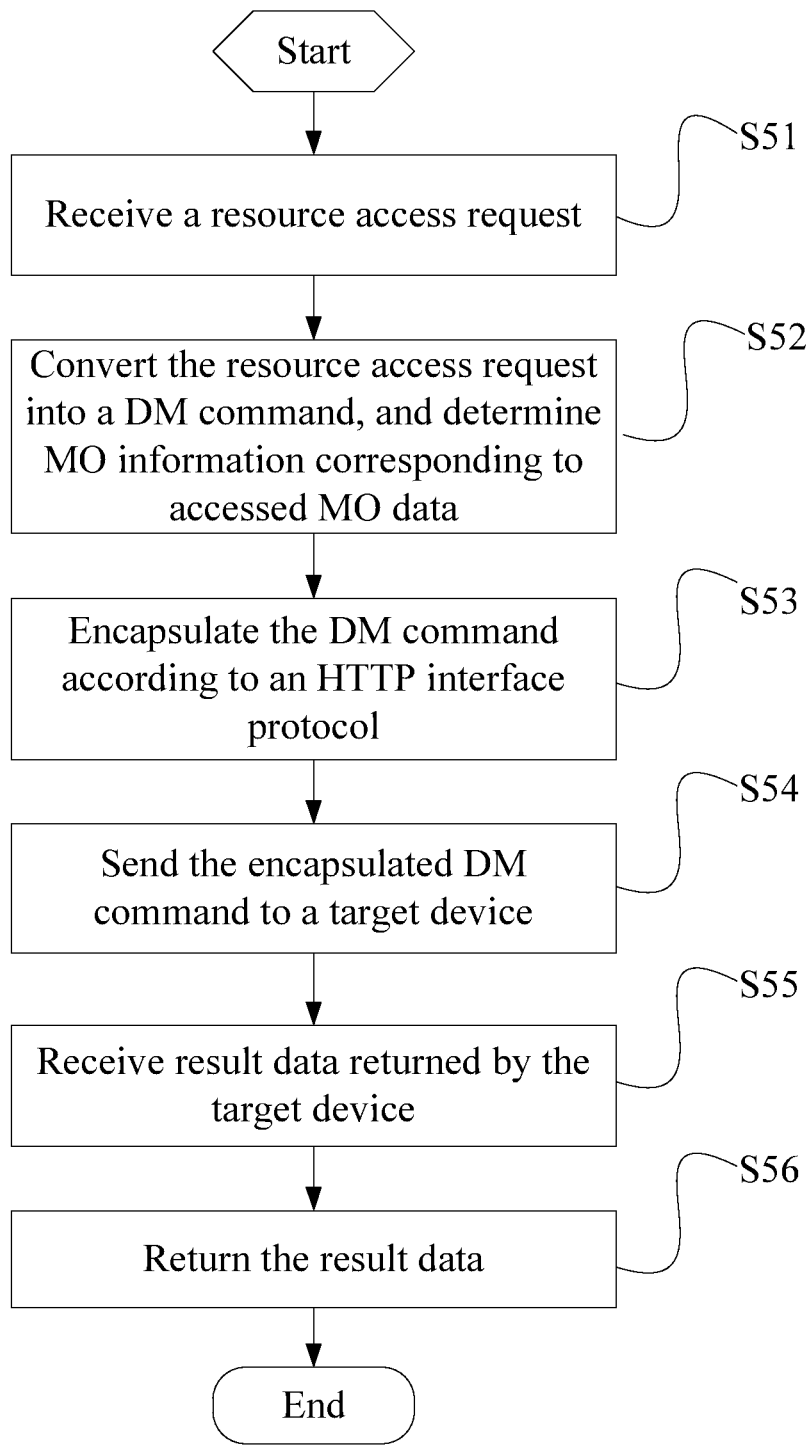
FIG. 5 is a flow chart of another device management method disclosed in an embodiment of the present invention.

The process of another device management method disclosed in an embodiment of the present invention may be shown in FIG. 5. The process also takes a platform middleware as an example, and also uses an XCAP resource access interface to establish a connection between an M2M application and an M2M platform. At this time, a device middleware may be also set on a device. The process includes the following steps:

Step S51: A resource access request may be received by using the XCAP resource interface, where the resource access request includes: a uniform resource identifier URI that may be used to indicate a storage location of an accessed management object MO data resource.

Step S52: According to pre-established or pre-created mapping between the resource access request of the MO data resource and a DM command, the resource access request of the MO data resource may be converted into its corresponding DM command. And according to pre-established or pre-created mapping between the MO data resource and MO information, the MO information corresponding to the accessed MO data may be determined.

Step S53: The DM command may be encapsulated according to an HTTP interface protocol.

The DM command may be encapsulated according to the resource-based HTTP interface protocol between the M2M platform and a device to change its bearer, thereby implementing the transfer of the DM command between the platform and the device. The HTTP interface in this embodiment may also be a basic XCAP interface protocol corresponding to a basic XCAP resource access request, or may also be an extended XCAP interface protocol corresponding to an extended XCAP resource access request. The extended XCAP interface protocol may correspond to the extension for the XCAP request in the embodiment shown in FIG. 2, or extension of the basic XCAP protocol according to other methods.

Step S54: The encapsulated DM command may be sent to a target device.

For example, the encapsulated DM command that may be obtained after conversion to the target device corresponding to the accessed MO data resource may sent. After receiving the DM command that is encapsulated according to the HTTP protocol, the device middleware parses it to a format that is recognizable for the DMC on the target device, for example, an OMA-DM protocol specification format, and then sends it to the DMC so that the DMC may recognize and execute the DM command to obtain result data.

Step S55: the result data generated and returned by the target device may be received after the target device executes the DM command.

Step S56: The result data may be returned.

the result data may be returned to a resource access requesting party, for example, the M2M application.

In the device management method disclosed in this embodiment, a procedure for encapsulating the DM command may be added. This embodiment is applicable to a scenario in which no independent communication interface between the DMS and the DMC is deployed in the existing system. In this case, no connection needs to be separately created between the DMS and the DMC to send the DM command. Instead, the DM command may be encapsulated by using the HTTP interface protocol between the M2M platform and device, so that the command may be directly transferred between the M2M platform and device. Therefore, the communication interface between the M2M platform and device may be reduced and the implementation is easy and convenient.

Figure 6:
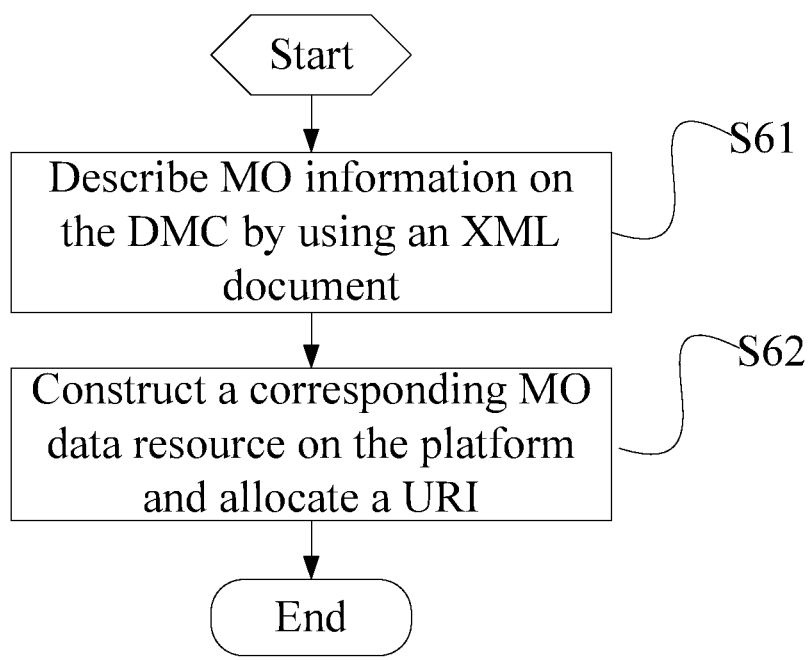
FIG. 6 is a flow chart of a method for creating a mapping between an management object (MO) data resource and MO information disclosed in an embodiment of the present invention.

An embodiment of the present invention discloses a method for creating mapping between an MO data resource and MO information. In this embodiment, the MO data resource corresponding to the MO information is created on an M2M platform. Its process is shown in FIG. 6, and includes the following steps:

Step S61: The MO information on the DMC may be described by using an XML document.

First, the MO information on the M2M device may be described by using an XML document according to the DM TNDS specification. By using the method provided in the DM TNDS specification, the MO tree on any one M2M device may be described by using an XML document, where each MO node on the MO tree corresponds to an element in the XML document, while the sub nodes and attributes of an MO mode may be described by using corresponding XML sub elements or attributes.

Step S62: An MO data resource corresponding to the MO information may be created on the M2M platform, and a URI may be allocated to the resource.

To Create the XML document that is used to describe the MO on the M2M device into a type of data resource on the M2M device or M2M platform, the MO data resource may be an XCAP resource, or a resource of other types. A URI related to the M2M device or M2M platform needs to be allocated to the XML document, for example, http://example.com/dev1/dm. In this manner, the target MO and its attributes on the specified M2M device may be accessed by using a sub path of the URI, for example, http://example.com/dev1/dm/TargetMO. Therefore, create a root MO resource corresponding to the M2M device, and establish a URI for it. For example, use http://domain1/dev1/dm as a root URI, and then map information about each specific MO node on the M2M device to make it be a sub MO resource under the root URI. In addition, components (such as elements and attributes) in a document are created into the corresponding sub resources, and are allocated corresponding URIs, that is, sub paths of the root URI. In this manner, a resource access request may be addressed to the fine granularity of each node of MO information.

To implement the device management function by using a resource access method, an OMA DM command needs to be mapped to make it be a corresponding resource access method. That is, create mapping between a DM command corresponding to MO information and a resource access request corresponding to the MO data resource. For a resource access request and a DM command that may implement the same operation, mapping between both may be directly created to meet the following purpose: The result of responding, by the accessed resource, to the resource access request may be the same as the result of receiving, by the corresponding MO information, the DM control command corresponding to the access request are the same. However, as a DM command and a resource access request are not in strict one-to-one mapping, a method for extending a resource request may be further required for a DM command that cannot be directly mapped to provide a device management operation and a function that are not supported by an existing DM system. The following takes an XCAP method as an example to describe the extension procedure.

To define the XCAP request method that is used to access the resource, according to the XCAP specification, the following information needs to be defined:

Application unique ID (Application Unique ID, AUID): for example, etsi-m2m-dm

Resource media type (MIME-type): according to the DM TNDS specification, it may be application/vnd.syncml.dmtnds+xml, or application/vnd.syncml.dmtnds+wbxml;

Default document naming space: for example, urn:etsi:m2m:xml:ns:dm

XML grammar and syntax: reference may be made to the regulations about the grammar and syntax in the DM TNDS specification;

Validity restriction: reference may be made to the DM TNDS specification and specific MO specification;

Access policy: reference may be made to the DM TNDS specification and implementation status of a specific MO;

Naming convention: The root path to the URI of the MO resource may be http://<domain>/<entity>/dm, where <domain> indicates the homing domain of the M2M system, <entity> indicates a unique identity of the M2M device or M2M platform, and "dm" may be a specific character string; in this manner, the M2M applications may flexibly access XCAP resources that are at different locations and are used to describe MO according to this convention.

In the prior art, the XCAP specification provides only three methods: GET; PUT; and DELETE, which correspond to: acquire; replace or add; and delete XCAP resources, respectively. The requirements of DM commands cannot be fully met. Therefore, certain extension to the XCAP method may be further required. Because the existing XCAP method is based on the HTTP technology, the present invention extends the XCAP method by introducing an HTTP POST method to implement mapping of all DM commands. The implementation method is described in Table 1. Table 1 is a mapping table between DM commands and XCAP methods.

TABLE 1

| DM Command | XCAP/HTTP Method | Description |
| --- | --- | --- |
| <Add> | PUT / POST | To add an MO node. |
| <Delete> | DELETE | To delete an MO node and its sub tree. |
| <Get> | GET | To acquire the value, sub tree, or sub tree structure of an MO node. |
| <Replace> | PUT | To update the value of an MO node. |
| <Results> | Message body | To carry return content data in the response message. |
| <Exec> | POST (cmd=exec) | To execute an executable MO. |
| <Copy> | POST (cmd=copy)/ GET + PUT | To replicate digits between leaf nodes. |
| <Atomic> | POST (cmd=atomic) | To combine multiple operations into an atomic operation. |
| <Sequence> | POST (cmd=sequence) | To execute an atomic operation in a required sequence. |
| <Alert> | POST (cmd=alert) | To report an asynchronous event. |

Specifically, DM commands <Add>, <Delete>, <Get>, and <Replace> may all be directly mapped to existing XCAP methods, including PUT, DELETE, and GET, where the <Add> command may be implemented by using the PUT method or POST method. The PUT method acts on the URI corresponding to the target MO node or attribute while the POST method acts on the URI corresponding to the parent node of the target MO node or attribute. The DM command <Results> may be usually used to carry result content of the <Get> command, and may be carried in the message body of the XCAP response message.

The DM command <Exec> usually acts on an executable MO node and may be used to instruct the DMC to execute a certain specific device management operation or task. This embodiment uses the POST method and carries the cmd=exec parameter that acts on the URI (for example, http://example.com/devl/dm/TargetMO) corresponding to the preceding MO node to implement the resource-based device management operation method that provides the same function, for example:
    POST    http://example.com/dev1/dm/TargetMO?cmd=exec The DM command <Copy> may be used to copy content in a source MO node to a target MO node. This embodiment uses the POST method and carries the cmd=copy parameter that acts on the URI (for example, http://example.com/dev1/dm/TargetMO) corresponding to the preceding target MO node and carries the URI (for example, http://example.com/dev1/dm/SourceMO) of the source MO node in the message body to implement the resource-based device management operation method that provides the same function, for example:
    POST    http://example.com/dev1/dm/TargetMO?cmd=copy
    Content-type: . . .
    Content-length: . . .
    <SourceURl>    http://example.com/dev1/dm/SourceMO </SourceURl>

Or, the DM command <Copy> may further be implemented by using a combination of the GET and PUT methods, that is, the content of the source MO node may be acquired by using the GET method, and then the acquired content may be written to the target MO node by using the PUT method.

The DM commands <Atomic> and <Sequence> are both used to implement combined operations of the preceding several DM commands and an atomic attribute needs to be guaranteed, that is, if one DM command cannot be executed, the entire operation fails. The difference may be that the <Atomic> command does not have a restriction for the execution sequence of several DM commands while the <Sequence> command requires that several DM commands be executed in a listed sequence. This embodiment uses the POST method and carries the cmd=atomic or cmd=sequence parameter that acts on the URI (for example, http://example.com/dev1/dm) corresponding to the root MO node on the target device and carries several DM commands in the message body where each command may be described by using a <Cmd> element to implement the resource-based device management operation method that provides the same function, for example:
    POST http://example.com/dev1/dm?cmd=atomic
    Content-type: . . .
    Content-length: . . .
    <Atomic>
    <Cmd> GET http://example.com/dev1/dm/TargetMO </cmd>
    <Cmd> DELETE http://example.com/dev1/dm/TargetMO </cmd>
    </Automic>

Or, in the preceding embodiment, the same parameter may also be used in the POST method, for example, cmd=trans, and DM commands <Atomic> and <Sequence> are distinguished by using the <Atomic> or <Sequence> element in the message body.

The DM command <Alert> may be used by the DMC to report asynchronous event information to the DMS. This embodiment uses the POST method, carries the cmd=alert parameter that acts on the URI (for example, http://example.com/dev1/dm) that may be dedicatedly used to receive asynchronous events on the DMS, and describes the event type or event code (for example, SERVER-INITIATED MGMT (1200)) and/or URI (for example, http://example.com/dev1/dm/SourceMO) corresponding to the source MO to implement the resource-based device management operation method that provides the same function, for example:
    POST http://example.com/dms1/dm?cmd=alert
    Content-type: . . .
    Content-length: . . .
    <Event> SERVER-INITIATED MGMT (1200)</Event>
    <Source> http://example.com/dev1/dm/SourceMO </Source>

Or, the POST method may further be used, the cmd=alert parameter that separately acts on the URI (for example, http://example.com/dms1/dm/1200) that may be used to receive asynchronous events of different types or codes on the DMS, and/or the URI (for example, http://example.com/dev1/dm/SourceMO) corresponding to the source MO in the message body be described to implement the resource-based device management operation method that provides the same function, for example:

POST http://example.com/dms1/dm/1200?cmd=alert
Content-type: . . .
Content-length: . . .
<Source> http://example.com/dev1/dm/SourceMO </Source>

Based on the methods provided in the preceding embodiment, all device management operations and functions for device MO in the existing OMA DM may be implemented by using the resource-based interface access manner.

Certainly, in addition to the preceding method, the present invention further discloses the following method:

In the M2M specification formulated by the ETSI (European Telecommunications Standards Institute, European telecommunications standards institute), any M2M device or M2M platform and the service capabilities provided by the M2M device or by the M2M platform may be abstracted as resources and have a uniform resource identifier, that is, URI. In addition, multiple resources may further create a group resource, and are uniquely identified by a common group identity, that is, a group URI. Therefore, when multiple M2M devices create a group, this embodiment may further creat a same MO resource of the multiple M2M devices into a virtual MO resource of the group, and then according to the device management method in any one of the preceding embodiments, implement batch device management operations for all M2M devices in the group by using access operations on the MO resource of the group.

Specifically, assume that M2M devices 1, 2, and 3 have the same MO node, and the following MO resources are created separately by using the method in the first embodiment:

http://example.com/dev1/dm/TargetMO
http://example.com/dev2/dm/TargetMO
http://example.com/dev3/dm/TargetMO In addition, assume that M2M devices 1, 2, and 3 belong to a group group1 the group URI of which is:

http://example.com/group1

Then, according to the method in this embodiment, the virtual MO resource of the group may be created:

http://example.com/group1/dm/TargetMO

By executing corresponding XCAP methods for the group MO resource, batch device management operations and functions such as retrieve, replacement, deletion, and addition may be implemented for the same target MO node of all M2M devices 1, 2, and 3. For example:

GET http://example.com/group1/dm/TargetMO

It means to request for acquiring information about the target MO node on all devices in the group. Then the device management function or middleware that receives this XCAP method acquires TargetMO information on M2M devices 1, 2, and 3 separately, and returns the summary result to the requesting party of the XCAP method.

Further, by extending the preceding XCAP method and/or parameters carried in the message body, the M2M application may further carry execution conditions for the access method when performing access by using a resource-based device management interface. The corresponding device management operation may be executed only when the execution conditions are met.

When the several execution conditions are only used for a separate device management operation, they may be carried in the command line parameters in corresponding XCAP methods. For example, assume that the MO that may be used to upgrade firmware of device 1 may be created as the resource http://example.com/dev1/dm/firmare, and a condition parameter minVer may be defined to indicate a minimum version number, man indicates a manufacturer, and mode indicates a product model. When an operation of upgrading the firmware for the device needs to be executed according to conditions, the following resource-based XCAP method should be executed:

PUT
http://example.com/dev1/dm/firmware?minVer=1.0&man=huawei&mode=cdma
Content-type: . . .
Content-length: . . .
{NewFirmwareImage}

This method indicates that the corresponding firmware upgrade operation may be executed only when the firmware version number of device 1 may be not smaller than "1.0", the manufacturer may be "huawei", and the model may be "cdma", where the new firmware package {NewFirmwareImage} may be carried by the message body of this method. In this manner, the device management function or middleware that receives this XCAP method will replace the M2M application to first acquire information such as the firmware version number, manufacturer, and product model of the target device, and compare against the conditions carried in the XCAP method, and execute subsequent firmware upgrade operations if all conditions are met. In this manner, the following trouble may be prevented: The M2M application needs to acquire related information by invoking methods such as GET multiple times in advance and compare against local conditions before it may upgrade device firmware by using the PUT method.

Further, when the several execution conditions are used for multiple device management operations, the conditions may be carried like scripts in the message bodies of corresponding XCAP methods. For example:

POST http://example.com/dev1/dm/firmware?cmd=sequence
Content-type: . . .
Content-length: . . .
<Sequence>
<Cmd> GET http:// . . . </cmd>
<Conditions composition="AND">
<minVer>1.0 </minVer>
<man> huawei </man>
</Conditions>
<Actions>
<Cmd> PUT http:// . . . </cmd>
<Cmd> DELETE http:// . . . </cmd>
</Actions>
<Conditions composition="OR"> . . . </Condition>
<Actions> . . . </Actions>
</Sequence>

Each group of conditions may be described by using one <Conditions> element that includes specific condition sub elements, for example, <minVer> indicates a minimum version number, <man> indicates a manufacturer, and <mode> indicates a product model. Combination relationship such as "or" (OR) or "and" (AND) between conditions may be described by using the composition attribute of the <Conditions> element. Corresponding device management operations are described by using one <Actions> element that includes several <Cmd> sub elements that are used to describe specific resource-based device management methods. In addition, XCAP methods that are executed unconditionally may exist, which are described by using the <Cmd> element other than the <Conditions> element.

Through the preceding improvement, resource access requests may include: device parameters corresponding to the accessed MO data resource, such as the preceding version number, manufacturer, and model, to implement control on MO data of devices that meet the parameters, making resource access requests finer and facilitating convenient and correct data control.

By using the resource-based device management method in which conditions can be carried, the operation procedure performed by M2M applications for implementing device management may be greatly simplified. In addition, it may be understood that this embodiment provides only certain examples of all possible executions and their combinations. Any MO node defined in existing OMA DM specifications, its attribute information, and related information may all be extended as execution conditions by using the methods provided in this embodiment.

This embodiment does not restrict the procedure for creating MO resources, which may be that the device middleware registers, by using a resource-based protocol, MO information maintained by the DMC as MO data resources on the platform middleware; or may also be that the DMC on the M2M device provides the MO information maintained by the DMC for the DMS by using a protocol interface between the DMS and the DMC in the DM system in the prior art, and the DMS registers the MO information as MO data resources on the platform middleware; or may also be that the device middleware uses a resource access protocol between the platform middleware and the device middleware to provide MO information maintained by the DMC for the DMS, and the DMS registers the MO information as MO data resources on the platform middleware.

This embodiment does not restrict extension of only the XCAP protocol. Likewise, other resource access protocols may be extended to meet the same purpose.

Figure 7:
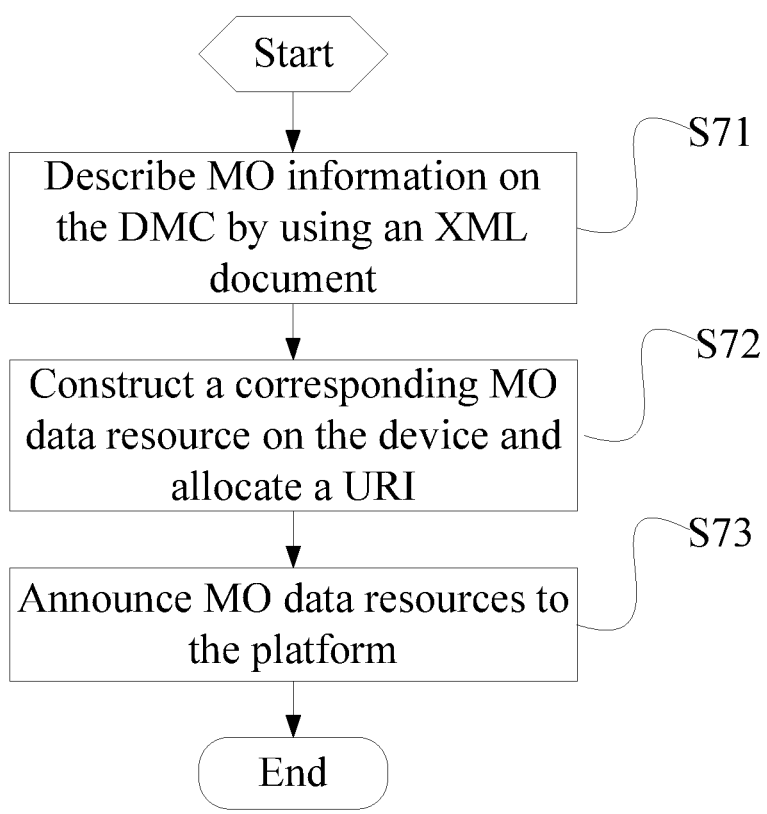
FIG. 7 is a flow chart of another method for creating a mapping between an MO data resource and MO information disclosed in an embodiment of the present invention.

The embodiment of the present invention discloses another method for creating mapping between an MO data resource and MO information. This method creates the MO data resource on an M2M device. Its process is shown FIG. 7, and includes the following steps:

Step S71: Management object (MO) information at a DMC may be described by using an extensible markup language XML document.

Step S72: An MO data resource corresponding to the MO information may be created on the M2M device, and a URI may be allocated to the resource, wherein the MO data resource may be an XML configuration access protocol XCAP resource.

Generally, when a URI may be allocated to a created MO data resource on the device, the URI may be directly allocated like in this step, or may be allocated by complying with a preset rule, for example, using the URI of the device as the basic part of the URI for the MO data resource. A platform middleware then may determine, according to the URI, that the MO data resource may be located on the device, and thereby may forward a resource access request corresponding to the URI to a corresponding target device.

An M2M application may also request access to, according to the preset rule, a URI for a MO data resource that is related to the target device but does not exist, which leads to access failure. In this case, in order that the M2M application and/or M2M platform may correctly find local MO resources registered on the M2M device, the local MO data resources registered on the device middleware may be announced to the platform middleware. Therefore, this embodiment may further include the following step:

Step S73: An announcement indicating that the MO data resource may be available may be sent to the platform.

Announce the MO data resource on the M2M platform. The specific implementation method for the announcement procedure may be an XCAP resource access method or any other known methods in the prior art.

Figure 8:
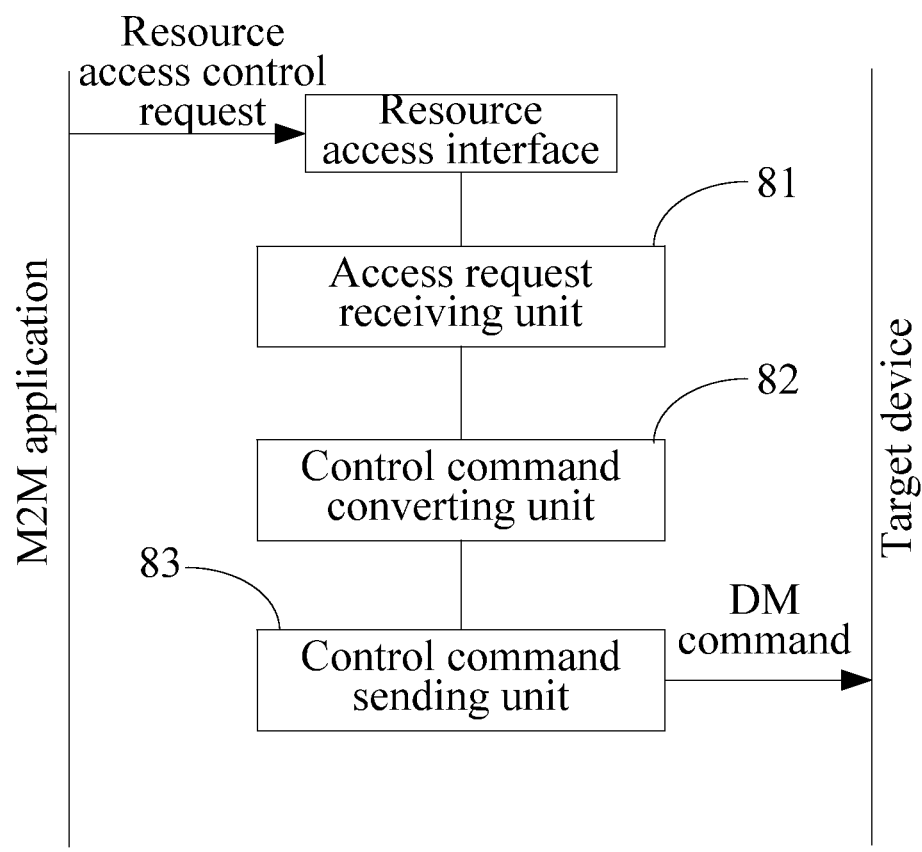
FIG. 8 is a schematic structural diagram of a middleware disclosed in an embodiment of the present invention.

The present invention further discloses a middleware that may implement the preceding device management methods. One of its structures is shown in FIG. 8, including: a resource access request receiving unit 81, a control command converting unit 82, and a control command sending unit 83, where:

The resource access request receiving unit 81 is configured to receive a resource access request by using a resource access interface of an external application (this embodiment takes an M2M application as an example for description), where the resource access request includes: a uniform resource identifier URI that may be used to indicate a storage location of an accessed management object MO data resource.

The control command converting unit 82 is configured to: convert, according to pre-created mapping between the resource access request of the MO data resource and a DM command, the resource access request of the MO data resource into a corresponding DM command, and determine, according to pre-created mapping between the MO data resource and MO information, the MO information corresponding to accessed MO data.

The control command sending unit 83 is configured to send the DM command to a device (that is, a target device) corresponding to the URI to manage the MO information corresponding to the accessed MO data resource.

The MO information on the M2M device may be mapped to make it be a MO data resource. The middleware pre-creates mapping between the resource access request and the DM command so that an external M2M application may access and control the MO information by using a resource access interface, thereby ensuring that the M2M application manages a remote device by using an open uniform interface.

Figure 9:
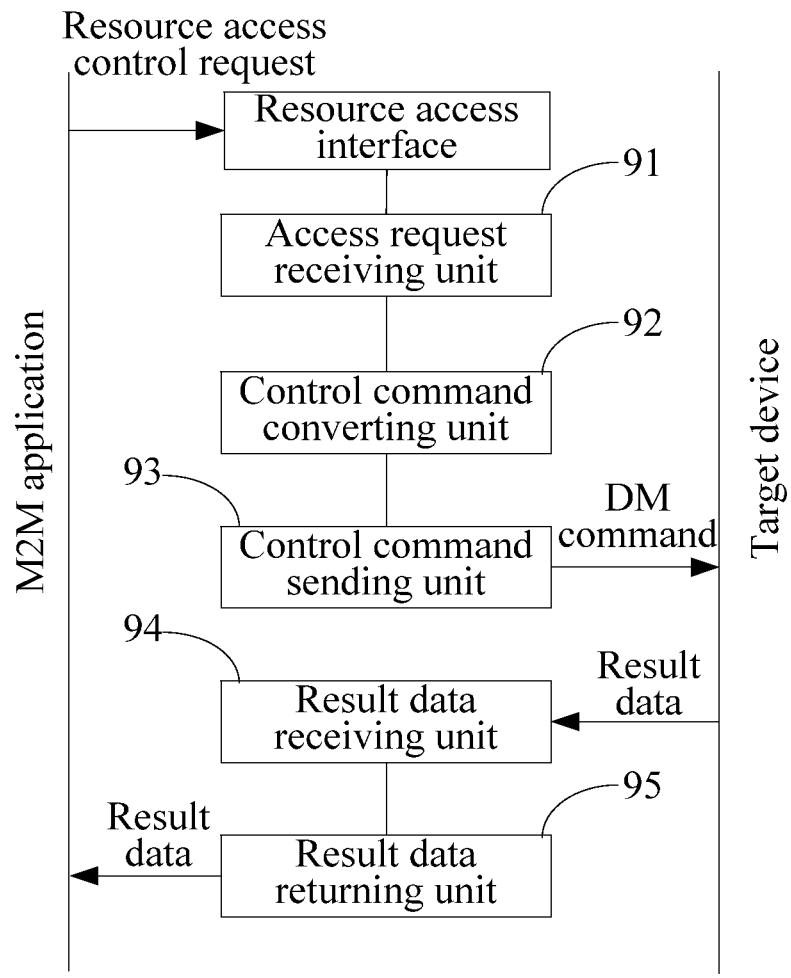
FIG. 9 is a schematic structural diagram of another middleware disclosed in an embodiment of the present invention.

FIG. 9 shows another middleware structure disclosed in an embodiment of the present invention. The middleware includes a resource access request receiving unit 91, a control command converting unit 92, a control command sending unit 93, a result data receiving unit 94, and a result data returning unit 95, where:

The functions of the resource access request receiving unit 91, control command converting unit 92, and control command sending unit 93 are the same as those of the units with the same names shown in FIG. 8, and are not described herein.

The result data receiving unit 94 is configured: to receive result data generated and returned by a target device after the target device executes the DM command.

The result data returning unit 95 is configured to return the result data to a sending end (for example, an M2M application) of a resource access request.

While ensuring that an external application (for example, the M2M application) manages a remote device by using an open uniform interface, this embodiment further adds a result feedback mechanism to facilitate device management.

Figure 10:
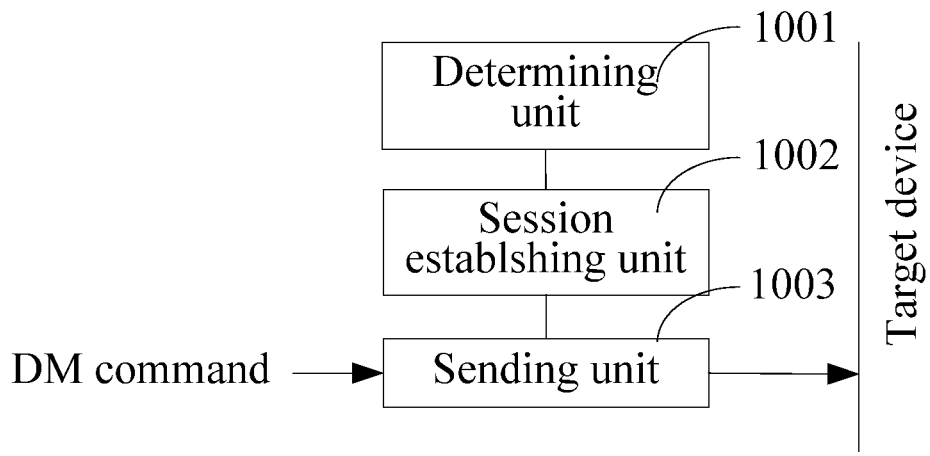
FIG. 10 is a schematic structural diagram of a control command sending unit in FIG. 8 or FIG. 9.

A structure of the preceding control command sending unit 83 or control command sending unit 93 is shown in FIG. 10, including: a determining unit 1001, a session establishing unit 1002, and a sending unit 1003, where:

The determining unit 1001 is configured to determine whether a session between a management server DMS and the target device exists.

The session establishing unit 1002 is configured to acquire a determination result of the determining unit 1001, and when the determination result indicates that the session between the DMS and the DMC of the target device does not exist, control the DMS to establish a session with the target device.

The sending unit 1003 is configured to send a DM command to the target device by using the session established between the DMS and the DMC of the target device.

The control command sending unit provided in this embodiment may first determine a connectivity status (that is, whether a session may be established) between the DMS and the target device, and establish a session when the session does not exist, ensuring that the DM command may be smoothly sent to the target device.

Figure 11:
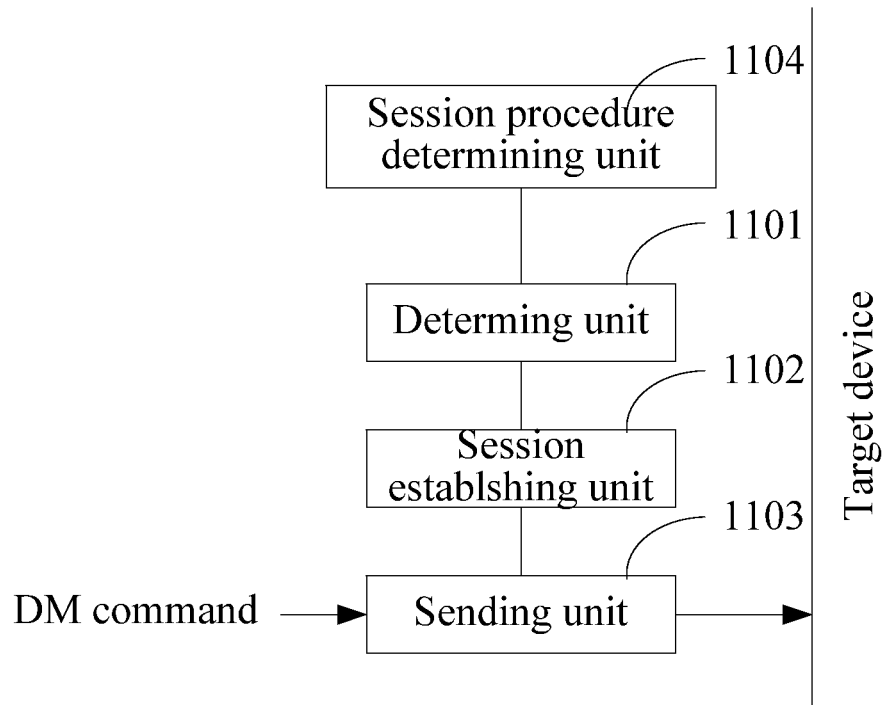
FIG. 11 is another schematic structural diagram of a control command sending unit in FIG. 8 or FIG. 9.

A structure of the preceding control command sending unit 83 or control command sending unit 93 is shown in FIG. 11, including: a determining unit 1101, a session establishing unit 1102, a sending unit 1103, and a session procedure determining unit 1104, where:

The functions of the determining unit 1101, session establishing unit 1102, and sending unit 1103 are basically the same as those of the units with the same names shown in FIG. 10, and are not described herein.

The session procedure determining unit 1104 is configured to determine whether a subsequent DM command exists within a preset session period after the sending unit 1103 completely sends a DM command; if a subsequent DM command exists, instruct the determining unit 1101 to continue working; if a subsequent DM command does not exist, send information instructing to close the session, instructing the DMS to close the session with the DMC at the target device.

The control command sending unit disclosed in this embodiment may avoid unnecessary overhead cost by maintaining a session when no subsequent DM commands exist.

In addition, the control command sending unit may further add an encapsulating unit on the basis of FIG. 10 or FIG. 11, which is configured to encapsulate, according to a preset protocol, the DM command to be sent by the sending unit 1003 or sending unit 1103.

The middleware disclosed in this embodiment may be an apparatus separated from an M2M platform and a device, or may also be an apparatus integrated on the M2M platform or device. In addition, its functions may be divided depending on different application scenarios, and the functions that are closely related to the platform or device are separately set on the platform middleware on the platform and the device middleware on the device. The middleware uses a resource access interface, such as an XCAP interface, so that an external M2M application may control MO resources by using a resource access request and convert control on MO resources into control on MO information on the device. In this manner, the M2M application may manage a remote device by using an open uniform interface.

This embodiment does not restrict the structure of the control command sending unit. Other structures may be used according to actual conditions.

For the specific working procedure of the middleware disclosed in this embodiment, reference may be made to the preceding method embodiments. The procedure is not described herein.

Figure 12:
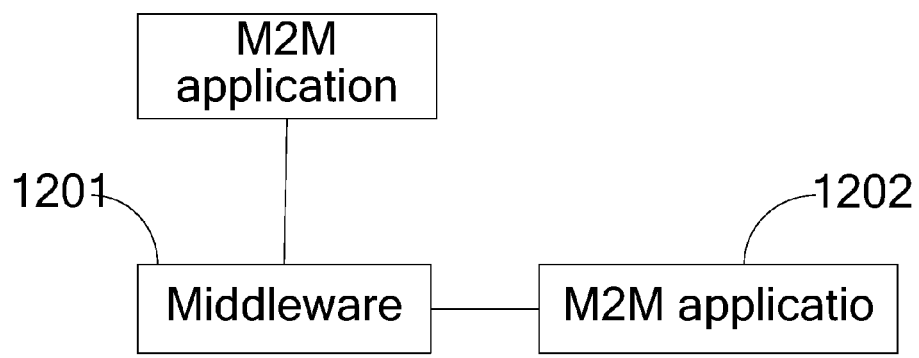
FIG. 12 is a schematic structural diagram of an M2M system disclosed in an embodiment of the present invention.

In addition, the present invention further discloses an M2M system. One of its structures is shown in FIG. 12, including a middleware 1201 and an M2M device 1202, where:

The middleware 1201 is configured to execute the following operations:

Receive a resource access request by using a resource access interface of an external application (for example, an M2M application), where the resource access request includes: a uniform resource identifier URI that may be used to indicate a storage location of an accessed management object MO data resource; convert, according to pre-created mapping between the resource access request of the MO data resource and a DM command, the resource access request of the MO data resource into a corresponding DM command, and determine, according to pre-created mapping between the MO data resource and MO information, the MO information corresponding to accessed MO data; and send the DM command to a target device corresponding to the URI to manage the MO information corresponding to the accessed MO data.

The M2M device 1202 is configured to receive and execute the DM command, obtain result data, and return the result data to the middleware 1201, so that the middleware 1201 returns the result data to the external application that sends the resource access request.

The structure of the middleware 1201 may be shown in FIG. 8 or FIG. 9.

The middleware 1201 in this embodiment may be an independent apparatus that works with the M2M device to perform device management operations or may further be set on the M2M device as a component of the M2M device and work with the DMC of the M2M device to perform device management operations. It may be seen that, when only device management is required, the M2M system provided in this embodiment may not have an M2M platform.

Figure 13:
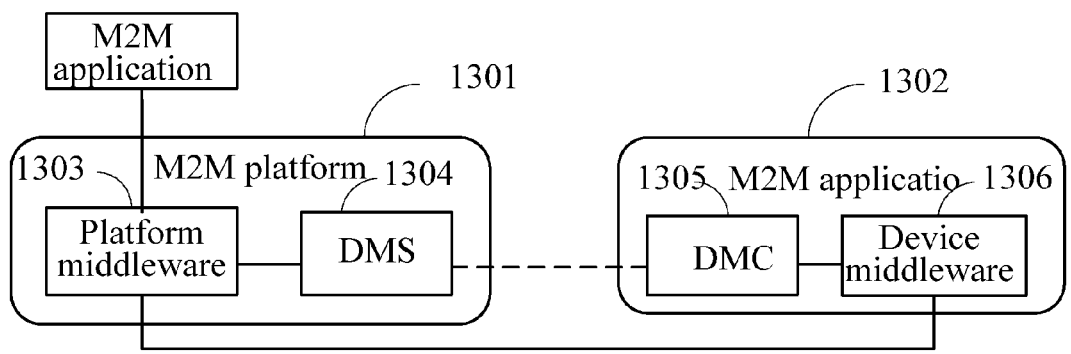
FIG. 13 is a schematic structural diagram of another M2M system disclosed in an embodiment of the present invention.

In addition, for the difference between the middlewares in this embodiment, other various forms of structure further exist. FIG. 13 shows an M2M system with another structure. This system includes: an M2M platform 1301 and an M2M device 1302, where the M2M platform has a DMS 1303 and a platform middleware 1304, and the M2M device 1302 has a DMC 1305 and a device middleware 1306, where:

The device middleware and the device management client DMC of the M2M device may adopt a separate design, and the device middleware may be connected to the DMC by using a local access interface opened by the DMC; or, the device middleware and the DMC adopt an integrated design; further, or the device middleware and the DMS adopt an integrated design, and the device middleware may be connected to the DMC by using an access interface of the OMA-DM protocol.

The platform middleware and the DMS in the M2M platform may adopt an integrated design, or the platform middleware and the DMS in the M2M platform or separated from the M2M platform are connected by using a local access interface opened by the DMS. This embodiment does not restrict a connection relationship between the platform middleware/device middleware and other components in the system. The specific connection form may be set as required according to actual conditions.

In this embodiment, the platform middleware 1304 and device middleware 1306 cooperate to perform the functions of the middleware in the system shown in FIG. 12. The working procedure of this system is as follows:

The device middleware 1306 sends the MO information on the M2M device described in the form of an XML document to the platform middleware in advance, and creates the MO information as an MO data resource on the platform middleware. The platform middleware 1304 receives the resource access request sent by the M2M application, finds the corresponding target device according to the URI in the resource access request, converts the resource access request by using pre-created mapping between MO data resource access requests and MO information into a DM command, determines MO information corresponding to the accessed MO resource data according to pre-created mapping between MO resource data and MO information, controls the DMS 1303 to establish a DM session between the DMS 1303 and the DMC 1305 by using the OMA-DM interface protocol, and sends the DM command by using the session to the DMC 1305 for execution. Then result data after execution is returned to the platform middleware 1304. The platform middleware 1304 returns it to the M2M application.

It should be noted that, in other embodiments, the DMS and DMC are not directly connected, and the session between both may be implemented upon communication between the platform middleware that connects the DMS and the device middleware that connects the DMC.

The M2M devices in each of the preceding embodiments may be various devices and apparatuses, such as sensors, micro controllers, mobile or fixed terminals, and gateways, that support remote device management capabilities, while M2M applications may be various personal or industrial applications related to machine-to-machine communication, such as electricity meter reading and intelligent traffic.

It may be easily understood that, the solutions provided in the present invention may actually further be deployed in other communications systems that need to implement device management by using resource access interface protocols, but are not restricted to the M2M application field.

It should be noted that the M2M platform and device that have the middlewares described previously in this system embodiment are all covered by the protection scope of the present invention.

All embodiments describe the present invention by using the progressive method. Each embodiment describes only the difference from other embodiments. For the similar parts among all embodiments, reference may be made to the relevant parts. The apparatus disclosed in the embodiment is related to the method disclosed in the embodiments, and is therefore outlined. For the associated part, reference may be made to the description in the method embodiments.

A person skilled in the art may further notice that the units, algorithms, and steps in each example described in the embodiments of the present invention may be implemented by electronic hardware, computer software, or combination of both. To clearly describe the changeability of the hardware and software, the composition and steps of each example are generally described according to functions in the preceding description. Whether these functions are executed by using hardware or software depends on the specific applications and design constraints of the technical solutions. A person skilled in the art may use different methods to implement the described functions for each specific application. However, such implementation should not be considered as beyond the scope of the present invention.

The steps of the methods or algorithms described in the embodiments of the present invention may be directly implemented by hardware, software modules executed by the processor, or a combination of both. The software module can be placed in a random access memory (RAM), memory, read only memory (ROM), electrically programmable ROM, electrically erasable and programmable ROM, register, hard disk, mobile disk, CD-ROM, or any other form of storage medium known to the technical domain.

The preceding description disclosed in the embodiments allows a person skilled in the art to implement or use the present invention. Multiple modifications to these embodiments are apparent for a person skilled in the art. The general principle defined in the present invention may be implemented in other embodiments without departing from the spirit or scope of the present invention. Therefore, the present invention will not be limited to the embodiments described in the document but extends to the widest scope that complies with the principle and novelty disclosed in the document.

We claim:

1. A device management method, comprising:
receiving, by a machine-to-machine communications platform, a resource access request sent by a machine-to-machine communications application using a resource access interface, wherein the resource access request comprises: a uniform resource identifier (URI) that is used to indicate a storage location of an accessed management object data resource, and the accessed management object data resource is created on the machine-to-machine communications platform and corresponds to management object information on a machine-to-machine communications device;
converting, by the machine-to-machine communications platform, according to a pre-created mapping between an operation indicated by the resource access request and a device management command, the operation indicated by the resource access request into a corresponding device management command;
determining, by the machine-to-machine communications platform, according to a pre-created mapping between the management object data resource and management object information, the management object information corresponding to accessed management object data resource; and
sending the device management command to the machine-to-machine communications device to manage the management object information corresponding to the accessed management object data.

2. The method according to claim 1, further comprising:
receiving result data generated and returned by the machine-to-machine communications device after the machine-to-machine communications device executes the device management command; and
returning the result data to respond to the resource access request.

3. The method according to claim 1, wherein the sending the device management command to the machine-to-machine communications device comprises:
determining whether a session between a device management server and the machine-to-machine communications device exists;
when the session between the device management server and the machine-to-machine communications device exists, controlling the device management server to send the device management command to the machine-to-machine communications device by using the session; and
when the session between the device management server and the machine-to-machine communications device does not exist, sending a session control command to the device management server to establish the session between the device management server and the machine-to-machine communications device, and sending the device management command to the machine-to-machine communications device by using the established session.

4. The method according to claim 1, wherein the sending the device management command to the machine-to-machine communications device further comprises:
determining that a subsequent device management command exists within a preset session period; and continuing an execution of the subsequent device management command.

5. The method according to claim 1, wherein a procedure for the pre-creating the mapping between the management object data resource and the management object information comprises:
describing the management object information in the machine-to-machine communications device by using an extensible markup language XML document; and
creating, on the machine-to-machine communications platform, an management object data resource corresponding to the management object information, and allocating a URI to the management object data resource.

6. The method according to claim 1, wherein the sending the device management command to the machine-to-machine communications device includes:
encapsulating, by the machine-to-machine communications platform according to a resource access protocol, the device management command; and
sending, by using a established session, the encapsulated device management command to the machine-to-machine communications device.

7. The method according to claim 1, wherein the pre-created mapping between the management object data resource and management object information comprises:
describing the management object information in the machine-to-machine communications device by using an extensible markup language XML document; and
creating, on the machine-to-machine communications platform, the management object data resource corresponding to the management object information, and allocating the URI to the management object data resource.

8. The method according to claim 7, further comprising:
sending, to the machine-to-machine communications platform, an announcement indicating that the management object data resource is available.

9. The method according to claim 1, wherein a type of the resource access request comprises: a basic resource access request, wherein types of the basic resource access request comprise a retrieve request, a replacement request, and a deletion request.

10. The method according to claim 1, wherein types of the resource access request further comprise: an extended resource access request extended by using a hypertext link protocol, wherein types of the extended resource access request comprise an execution request, a copy request, an atomic operation request, a sequential atomic operation request, an asynchronous reporting request, a request for a group device operation, a condition operation request, and a combined condition operation request.

11. A machine-to-machine communications system, comprising:
a machine-to-machine communications device and a middleware, wherein:
the middleware is configured to:
receive a resource access request sent by an machine-to-machine communications application using a resource access interface, where the resource access request includes: a uniform resource identifier (URI) that is used to indicate a storage location of an accessed management object data resource, and the accessed management object data resource is created on the machine-to-machine communications platform and corresponds to management object information on a machine-to-machine communications device;
convert, according to a pre-created mapping between an operation indicated by the resource access request and a device management command, the operation indicated by the resource access request into a corresponding device management command;
determine, according to a pre-created mapping between the management object data resource and the management object information, the management object information corresponding to the accessed management object data resource; and
send the device management command to the machine-to-machine communications device corresponding to the URI to manage the management object information corresponding to the accessed management object data resource; and
wherein the machine-to-machine communications device is configured to receive and execute the device management command, obtain result data, and return the result data to the middleware.

12. The system according to claim 11, wherein the middleware is set on the machine-to-machine communications platform.

13. The system according to claim 11, wherein the middleware comprises: a platform middleware set on the machine-to-machine communications platform and a device middleware set on the machine-to-machine communications device, and the platform middleware and the device middleware cooperate to implement functions of the middleware.

14. The system according to claim 13, wherein the device middleware and a device management client in the device adopt a separate design, and the device middleware is connected to the device management client by using a local access interface opened by the device management client; or, the device middleware and the device management client adopt an integrated design; or the device middleware and a device management server adopt an integrated design, and the device middleware is connected to the device management client by using an access interface of an device management defined by an open mobile alliance OMA-DM protocol.

15. The system according to claim 14, wherein the platform middleware and the device management server adopt an integrated design, or the platform middleware and the device management server are connected by using a local access interface opened by the device management server.

16. A non-transitory computer readable medium comprising a computer program product for use by a network component, the computer program product comprising computer executable instructions stored on the non-transitory computer readable medium such that when executed by a processor cause the network component to:
receive a resource access request sent by a machine-to-machine communications application using a resource access interface, wherein the resource access request comprises: a uniform resource identifier (URI) that is used to indicate a storage location of an accessed management object data resource, and the accessed management object data resource is created on the machine-to-machine communications platform and corresponds to management object information on a machine-to-machine communications device;
convert, according to a pre-created mapping between an operation indicated by the resource access request and a device management command, the operation indicated by the resource access request into a corresponding device management command;

determine, according to a pre-created mapping between the management object data resource and management object information, the management object information corresponding to accessed management object data resource; and send the device management command to the machine-to-machine communications device to manage the management object information corresponding to the accessed management object data.

17. A computer program product comprising computer executable instructions stored on a non-transitory computer readable medium such that when the computer executable instructions are executed by a computer program processor to implement a device management that:

receiving a resource access request sent by a machine-to-machine communications application using a resource access interface, wherein the resource access request comprises: a uniform resource identifier (URI) that is used to indicate a storage location of an accessed management object data resource, and the accessed management object data resource is created on the machine-to-machine communications platform and corresponds to management object information on a machine-to-machine communications device;

converting, according to a pre-created mapping between an operation indicated by the resource access request and a device management command, the operation indicated by the resource access request into a corresponding device management command;

determining, according to a pre-created mapping between the management object data resource and management object information, the management object information corresponding to accessed management object data resource; and sending the device management command to the machine-to-machine communications device to manage the management object information corresponding to the accessed management object data.

18. A machine-to-machine communications platform for managing device, comprising:

a storage device storing computer executable program codes;

a communication interface; and a processor, coupled with the storage device and the communication interface;

wherein the program codes comprise instructions which, when executed by the processor, cause the processor to:

receive a resource access request sent by a machine-to-machine communications application using a resource access interface, wherein the resource access request comprises: a uniform resource identifier (URI) that is used to indicate a storage location of an accessed management object data resource, and the accessed management object data resource is created on the machine-to-machine communications platform and corresponds to management object information on a machine-to-machine communications device;

convert, according to a pre-created mapping between an operation indicated by the resource access request and a device management command, the operation indicated by the resource access request into a corresponding device management command;

determine, according to a pre-created mapping between the management object data resource and management object information, the management object information corresponding to accessed management object data resource; and send the device management command to the machine-to-machine communications device to manage the management object information corresponding to the accessed management object data.

* * * * *